US012767050B2

(12) United States Patent
Yasaku et al.

(10) Patent No.: US 12,767,050 B2
(45) Date of Patent: Oct. 20, 2026

(54) SYSTEM FOR DISPLAYING IMAGE AROUND WORK VEHICLE, METHOD, AND WORK VEHICLE

(71) Applicant: KOMATSU LTD., Tokyo (JP)

(72) Inventors: Shun Yasaku, Tokyo (JP); Koichi Tamura, Tokyo (JP); Kota Yamaguchi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 60 days.

(21) Appl. No.: 18/858,371

(22) PCT Filed: Sep. 29, 2023

(86) PCT No.: PCT/JP2023/035716

§ 371 (c)(1),
(2) Date: Oct. 21, 2024

(87) PCT Pub. No.: WO2024/071405

PCT Pub. Date: Apr. 4, 2024

(65) Prior Publication Data

US 2025/0282289 A1 Sep. 11, 2025

(30) Foreign Application Priority Data

Sep. 30, 2022 (JP) ................................ 2022-158040

(51) Int. Cl.

| | |
|---|---|
| ***G06F 17/00*** | (2019.01) |
| ***B60R 1/24*** | (2022.01) |
| ***B60R 1/25*** | (2022.01) |
| ***B60R 1/26*** | (2022.01) |

(52) U.S. Cl.

CPC .................. *B60R 1/24* (2022.01); *B60R 1/25* (2022.01); *B60R 1/26* (2022.01); *B60R 2300/105* (2013.01); *B60R 2300/302* (2013.01); *B60R 2300/802* (2013.01)

(58) Field of Classification Search

CPC .... B60R 1/24; B60R 1/25; B60R 1/26; B60R 2300/105; B60R 2300/302; B60R 2300/802; B60R 1/00; B60R 1/20; H04N 7/18

USPC .............................................................. 701/1

See application file for complete search history.

(56) References Cited

U.S. PATENT DOCUMENTS

| | | | | |
|---|---|---|---|---|
| 10,421,400 | B2 * | 9/2019 | Imaizumi | H04N 7/18 |
| 11,170,234 | B2 * | 11/2021 | Nakazawa | G06V 20/58 |
| 11,772,941 | B2 * | 10/2023 | Hayashi | B66C 15/065 212/299 |
| 2009/0259400 | A1 * | 10/2009 | Coats | G01S 13/87 701/301 |
| 2016/0257252 | A1 * | 9/2016 | Zaitsev | G06V 20/56 |

(Continued)

FOREIGN PATENT DOCUMENTS

| | | | | | |
|---|---|---|---|---|---|
| AU | 2016255874 | A1 * | 3/2017 | E02F 9/261 |
| CA | 2941999 | C * | 7/2019 | G01C 21/3461 |

(Continued)

OTHER PUBLICATIONS

Proximity Warning Core (Year: 2025).*

*Primary Examiner* — Ronnie M Mancho

(74) *Attorney, Agent, or Firm* — Fish & Richardson P.C.

(57) ABSTRACT

A monitor control device selects any one of camera images captured by a camera system based on a steering angle of front wheels and outputs a signal for displaying the selected image on a display device.

10 Claims, 10 Drawing Sheets

(56) References Cited

U.S. PATENT DOCUMENTS

| | | | | |
|---|---|---|---|---|
| 2017/0351256 | A1* | 12/2017 | Kumakiri | B60W 60/0053 |
| 2018/0079361 | A1* | 3/2018 | Yamashita | H04N 23/698 |
| 2024/0052602 | A1* | 2/2024 | Matsumoto | H04N 7/18 |

FOREIGN PATENT DOCUMENTS

| | | | | | |
|---|---|---|---|---|---|
| CN | 116723963 | A | * | 9/2023 | E02F 9/261 |
| CN | 112644512 | B | * | 7/2024 | B60W 40/105 |
| DE | 102014107158 | B4 | * | 4/2021 | G06V 20/58 |
| JP | 2007223338 | A | * | 9/2007 | B60K 37/10 |
| JP | 5501452 | B2 | * | 5/2014 | G01S 15/931 |
| JP | 2017046277 | A | * | 3/2017 | B60R 1/27 |
| JP | 2018039648 | A | * | 3/2018 | |
| JP | 6760122 | B2 | * | 9/2020 | H04N 23/57 |
| JP | 2020-189604 | A | | 11/2020 | |
| JP | 2022127328 | A | * | 8/2022 | B60R 1/00 |
| WO | WO-2006006689 | A1 | * | 1/2006 | B60K 37/10 |
| WO | WO-2017131243 | A1 | * | 8/2017 | H04N 7/18 |
| WO | WO-2019193819 | A1 | * | 10/2019 | H04N 7/18 |
| WO | WO 2022/176586 | A1 | | 8/2022 | |

* cited by examiner

SYSTEM FOR DISPLAYING IMAGE AROUND WORK VEHICLE, METHOD, AND WORK VEHICLE

CROSS-REFERENCE TO RELATED APPLICATIONS

This application is a National Stage application of International Application No. PCT/JP2023/035716, filed on Sep. 29, 2023, which claims priority to Japanese Patent Application No. 2022-158040, filed on Sep. 30, 2022. The contents of the prior applications are incorporated herein in their entirety.

TECHNICAL FIELD

The present disclosure relates to a system and a method for displaying a peripheral image of a work vehicle, and the work vehicle.

BACKGROUND ART

Patent Document 1 discloses a technology related to a peripheral monitoring system of a work vehicle.

CITATION LIST

Patent Document

Patent Document 1: Japanese Unexamined Patent Application, First Publication No. 2022-127328

SUMMARY OF INVENTION

Technical Problem

The peripheral monitoring system of the work vehicle disclosed in Patent Document 1 includes a display unit that displays images of the periphery of the work vehicle. The operator of the work vehicle can recognize the situation of the periphery of the work vehicle by checking the image displayed on the display unit. Meanwhile, the cab of the work vehicle is disposed on the rear side of the front wheels. Therefore, when the operator allows the work vehicle to travel, it is difficult to recognize the situation in front of the work vehicle in a traveling direction according to steering operation. An object of the present disclosure is to provide a system and a method for displaying a peripheral image of a work vehicle, which can make an operator appropriately recognize a situation in front of the work vehicle in a traveling direction according to steering operation, and the work vehicle.

Solution to Problem

According to an aspect of the present invention, there is provided a system for displaying a peripheral image of a work vehicle including a vehicle body, and front wheels that are attached so as to be steerable to a front end part of the vehicle body, the system including: a steering angle sensor configured to detect a steering angle of the front wheel; a plurality of cameras that are provided on the vehicle body to image in different directions; a display device; and a processor. The processor selects any one of images captured by the plurality of cameras based on the detected steering angle of the front wheel. The processor outputs a signal for displaying the selected image on the display device.

According to an aspect of the present invention, there is provided a method for displaying a peripheral image of a work vehicle including a vehicle body, front wheels that are attached so as to be steerable to a front end part of the vehicle body, a steering angle sensor configured to detect a steering angle of the front wheel, a plurality of cameras that are provided on the vehicle body to image in different directions, and a display device, the method including: a step of detecting the steering angle of the front wheels detected by the steering angle sensor; a step of selecting any one of images captured by the plurality of cameras based on the steering angle of the front wheel; and a step of outputting a signal for displaying the selected image on the display device.

According to an aspect of the present invention, there is provided a work vehicle including: a vehicle body; front wheels that are attached so as to be steerable to a front end part of the vehicle body; a cab that is supported by the vehicle body to be disposed on a rear side of the front wheel; a steering angle sensor configured to detect a steering angle of the front wheel; a plurality of cameras that are provided on the vehicle body to image in different directions; a display device that is provided in the cab; a processor. The processor selects any one of images captured by the plurality of cameras based on the detected steering angle of the front wheel. The processor outputs a signal for displaying the selected image on the display device.

Advantageous Effects of Invention

According to the above aspect, the work vehicle can make the operator appropriately recognize the situation in front of the work vehicle in the traveling direction according to the steering operation.

DESCRIPTION OF EMBODIMENTS

In the present embodiment, a local coordinate system is set in a work vehicle 1, and a positional relationship of each of units will be described with reference to the local coordinate system. In the local coordinate system, a first axis extending in the left-right direction (the vehicle width direction) of the work vehicle 1 is defined as the X axis, a second axis extending in the front-rear direction of the work vehicle 1 is defined as the Y axis, and a third axis extending in the up-down direction of the work vehicle 1 is defined as the Z axis. The X axis and the Y axis are orthogonal to each other. The Y axis and the Z axis are orthogonal to each other. The Z axis and the X axis are orthogonal to each other. A +X direction is the right direction, and a −X direction is the left direction. A +Y direction is the front direction, and a −Y direction is the rear direction. A +Z direction is the up direction, and a −Z direction is the down direction.

First Embodiment

<<Work Vehicle>>

Figure 1:
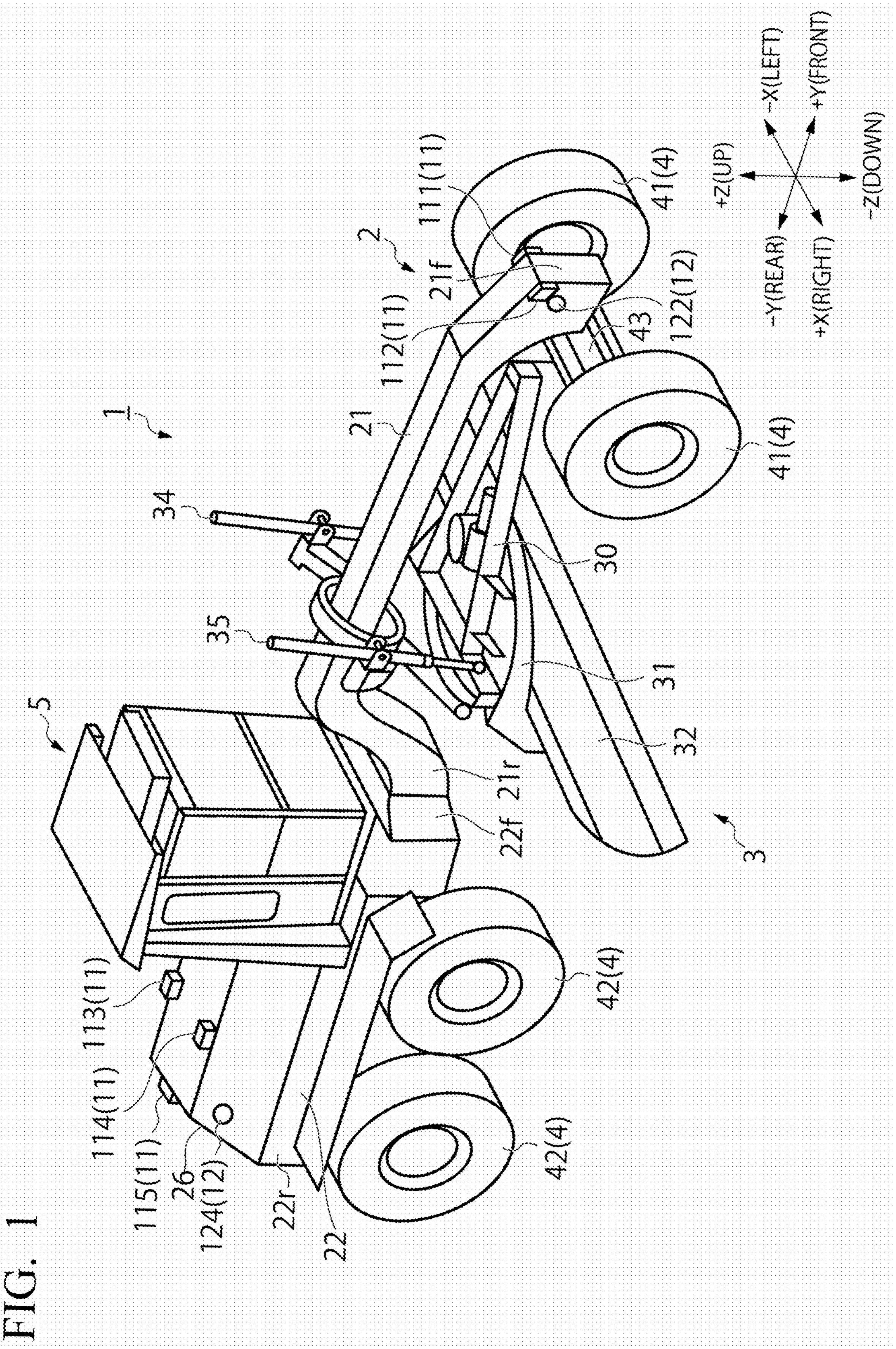
FIG. 1 is a perspective view of a work vehicle according to a first embodiment.
Figure 2:
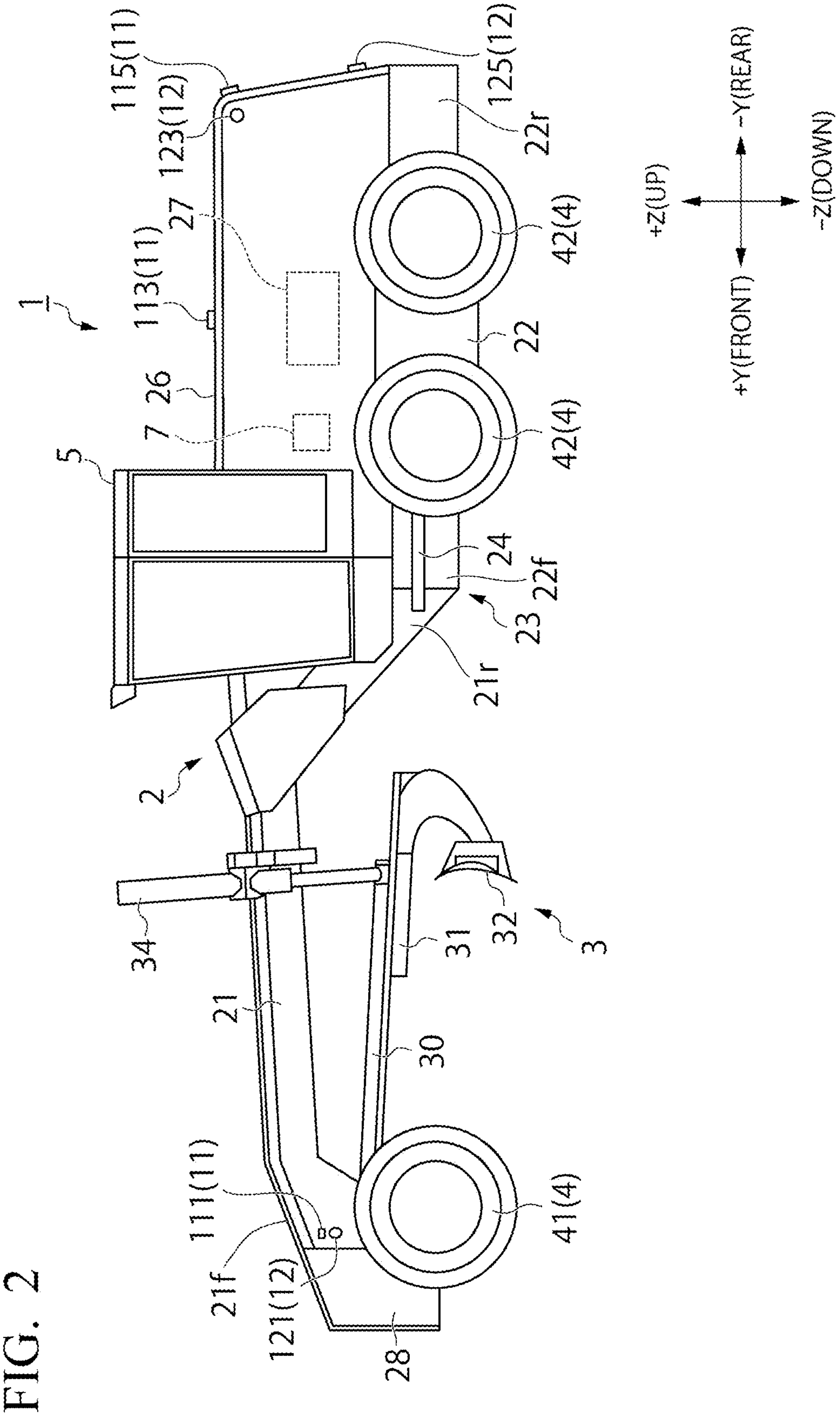
FIG. 2 is a side view of a work vehicle according to the first embodiment.

Hereinafter, the embodiment will be described in detail with reference to the drawings. FIG. 1 is a perspective view of a work vehicle 1 according to the first embodiment. FIG. 2 is a side view of a work vehicle 1 according to the first embodiment. The work vehicle 1 according to the first embodiment is a motor grader.

As shown in FIGS. 1 and 2, the work vehicle 1 includes a vehicle body 2, work equipment 3, wheels 4, and a cab 5.

The work vehicle 1 travels on the work site by the wheels 4. The work vehicle 1 performs works using the work equipment 3. Examples of the work performed by the work vehicle 1 include leveling work, road surface cutting work, excavation work, snow removal work, and material mixing work.

The vehicle body 2 supports the work equipment 3. The vehicle body 2 includes a front vehicle body 21 and a rear vehicle body 22. The front vehicle body 21 is disposed in front of the rear vehicle body 22. The front vehicle body 21 is swingably coupled to the rear vehicle body 22 via a coupling shaft 201. The front vehicle body 21 is swingable with respect to the rear vehicle body 22 in the left-right direction about the coupling shaft 201. The coupling shaft 201 is a shaft extending in the Z-axis direction. The front vehicle body 21 includes a rear end part 21*r* that is coupled to the rear vehicle body 22 and a front end part 21*f* that is provided on the side opposite to the rear end part 21*r*.

A counterweight 28 is attached to the front end part 21*f* of the front vehicle body 21. The counterweight 28 is a type of attachment attached to the front vehicle body 21. The counterweight 28 is mounted on the front vehicle body 21 to increase the downward load applied to front wheels 41, enabling steering and increasing the pressing load of the blade 32.

The rear vehicle body 22 extends rearward from the coupling shaft 201. The rear vehicle body 22 includes a front end part 22*f* that is coupled to the front vehicle body 21 and a rear end part 22*r* that is provided on the side opposite to the front end part 22*f*. A front end part 21*f* of the front vehicle body 21 is the front end part of the vehicle body 2. A rear end part 22*r* of the rear vehicle body 22 is the rear end part of the vehicle body 2.

Figure 3:
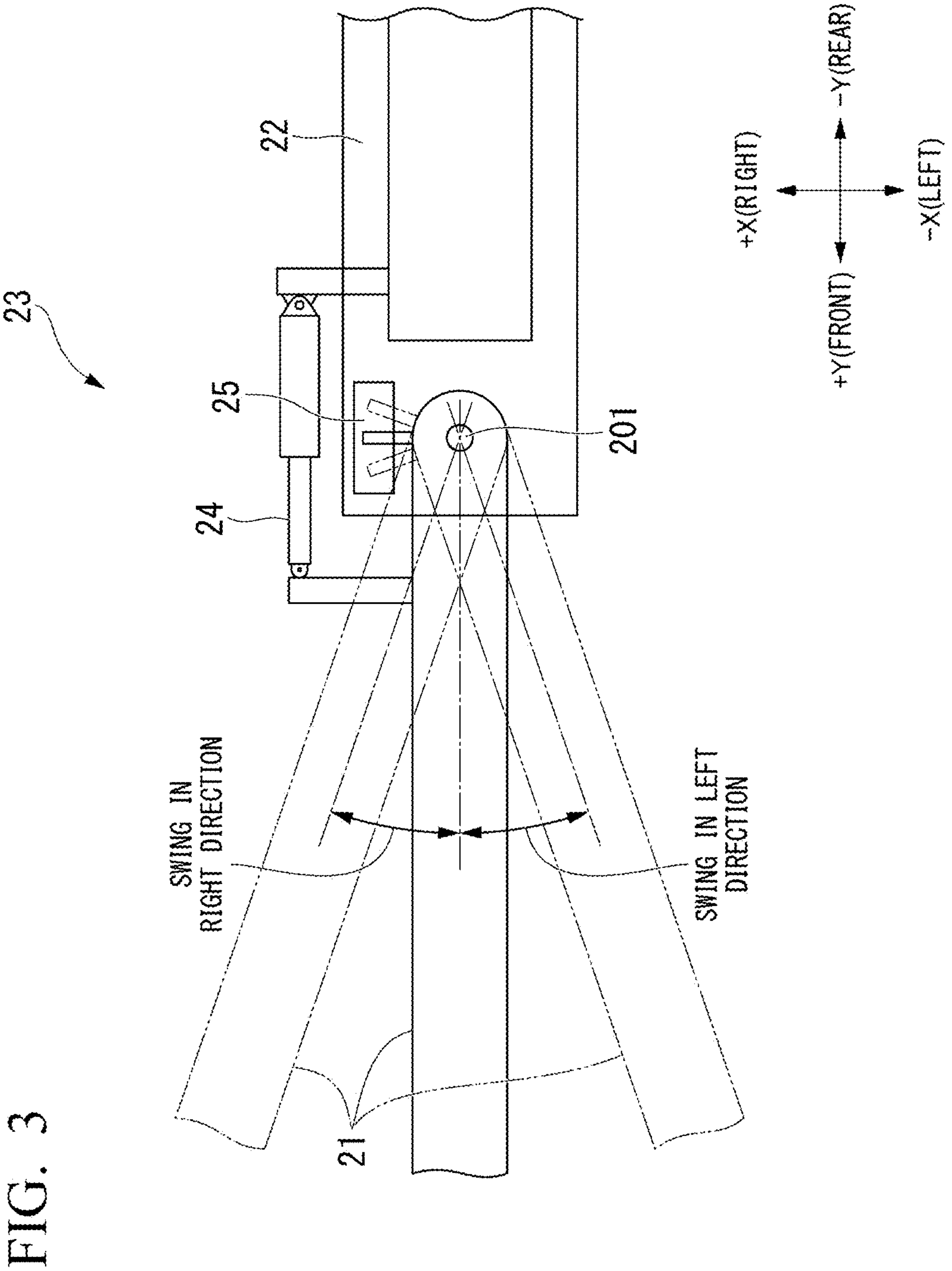
FIG. 3 is a top view schematically showing an articulation mechanism of a work vehicle according to the first embodiment.

FIG. 3 is a top view schematically showing an articulation mechanism 23 of the work vehicle 1 according to the first embodiment.

As shown in FIG. 3, the front vehicle body 21 and the rear vehicle body 22 are swingably coupled by the coupling shaft 201. The front vehicle body 21 is swung with respect to the rear vehicle body 22 by the articulation mechanism 23. The front vehicle body 21 is swung with respect to the rear vehicle body 22 by the articulation mechanism 23 so as to change the angle (articulation angle) formed with the rear vehicle body 22.

The articulation mechanism 23 includes an articulation cylinder 24 coupled to the front vehicle body 21 and the rear vehicle body 22. The articulation cylinder 24 expands and contracts, causing the front vehicle body 21 to swing in the left-right direction with respect to the rear vehicle body 22. The swing of the front vehicle body 21 with respect to the rear vehicle body 22 is performed by expanding and contracting the articulation cylinder 24 coupled between the front vehicle body 21 and the rear vehicle body 22 through the operation of the operation device 6. The articulation cylinder 24 is, for example, a hydraulic cylinder. An articulation angle sensor 25 is attached to the rear vehicle body 22 and detects the articulation angle, which is the swing angle of the front vehicle body 21 with respect to the rear vehicle body 22.

The work vehicle 1 swings (articulates) the front vehicle body 21 with respect to the rear vehicle body 22, thereby, reduces the swing radius during swinging and can perform ditch digging or slope cutting by offset traveling. The offset traveling refers to the straight travel of the work vehicle 1 by setting the swing direction of the front vehicle body 21 with respect to the rear vehicle body 22 and the steering directions of the front wheels 41 with respect to the front vehicle body 21 in opposite directions.

The rear vehicle body 22 supports a power source 27. The rear vehicle body 22 includes an exterior 26. The exterior 26 forms an engine room that houses the power source 27. The power source 27 is, for example, an engine.

The work equipment 3 is supported by the front vehicle body 21. The work equipment 3 includes a drawbar 30, a swing circle 31, a blade 32, a swing motor 33, and various cylinders 34 to 38.

The drawbar 30 is disposed below the front vehicle body 21. A front end part of the drawbar 30 is coupled to a front end part 21*f* of the front vehicle body 21 via a ball shaft portion. A front end part of the drawbar 30 is swingably supported by a front end part 21*f* of the front vehicle body 21. A rear end part of the drawbar 30 is supported by the front vehicle body 21 via a pair of lift cylinders 34 and 35. The drawbar 30 is suspended from the front vehicle body 21 via the pair of lift cylinders 34 and 35. A drawbar shift cylinder 36 is attached to a side end part of the front vehicle body 21 and the drawbar 30. The drawbar 30 moves in the left-right direction with respect to the front vehicle body 21 by the expansion and contraction of the drawbar shift cylinder 36.

The swing circle 31 is disposed below the front vehicle body 21. The swing circle 31 is disposed below the drawbar 30. The swing circle 31 is supported to be swingable at a rear end part of the drawbar 30. The swing circle 31 can be driven to swing in a clockwise or counterclockwise direction with respect to the drawbar 30 as viewed from above the vehicle by the swing motor 33. The swing drive of the swing circle 31 adjusts a tilt angle (blade propulsion angle) of the blade 32 with respect to the front vehicle body 21 in a plan view.

The blade 32 is disposed between the front end part 21*f* of the front vehicle body 21 and the rear end part 22*r* of the rear vehicle body 22. The blade 32 is supported by the swing circle 31. The blade 32 is supported by the drawbar 30 via the swing circle 31. The blade 32 is supported by the front vehicle body 21 via the drawbar 30. The swing circle 31 is swung to adjust a propulsion angle of the blade 32. The propulsion angle of the blade 32 refers to the tilt angle of the blade 32 with respect to the Y axis.

The pair of lift cylinders 34 and 35 support the drawbar 30. The pair of lift cylinders 34 and 35 support the blade 32 via the drawbar 30. The rear end part of the drawbar 30 moves in the up-down direction with respect to the front vehicle body 21 by the synchronized expansion and contraction of the pair of lift cylinders 34 and 35. That is, the heights of the drawbar 30 and the blade 32 are adjusted by the synchronized expansion and contraction of the pair of lift cylinders 34 and 35. In addition, the drawbar 30 swings about an axis along the Y axis due to the different expansions and contractions of the lift cylinders 34 and 35.

A blade shift cylinder 37 is attached to the swing circle 31 and the blade 32, and is disposed along the longitudinal direction of the blade 32. The blade 32 is moved in the left-right direction with respect to the swing circle 31 by the blade shift cylinder 37.

The tilt cylinder 38 is attached to the swing circle 31 and the blade 32. By expanding and contracting the tilt cylinder 38, the blade 32 swings about an axis extending in the longitudinal direction of the blade 32 with respect to the swing circle 31.

As described above, the blade 32 is configured to be able to change the tilt angle with respect to the front vehicle body 21, move in the up-down direction with respect to the vehicle, swing about the axis along the Y axis, move in the left-right direction with respect to the swing circle 31, and swing about the axis extending in the longitudinal direction of the blade 32, via the drawbar 30 and the swing circle 31.

A wheel 4 support a vehicle body 2. The wheels 4 includes the front wheels 41 and rear wheels 42. The front wheels 41 are disposed in front of the rear wheels 42. In the front-rear direction, the blade 32 is disposed between the front wheels 41 and the rear wheels 42. The front wheels 41 are disposed in front of the blade 32. The rear wheels 42 are disposed on the rear side of the blade 32. In the first embodiment, the work vehicle 1 is provided with traveling wheels consisting of two front wheels 41, one on each side, and four rear wheels 42, two on each side, making a total of six wheels. However, the number and arrangement of the front wheels 41 and the rear wheels 42 are not limited thereto.

The front wheels 41 are attached so as to be steerable to the front end part **21*f* of the front vehicle body 21. The front wheels 41 are attached to the front vehicle body 21 via a steering mechanism 43. The front wheels 41 can change their direction with respect to the front vehicle body 21 by the steering mechanism 43. The front wheels 41 operate to change an angle (steering angle) with respect to the front vehicle body 21**.

The rear wheels 42 are rotatably attached to the rear vehicle body 22. The rear wheels 42 rotate based on the power generated by the power source 27. The rear wheels 42 rotate based on the power generated by the power source 27 via the power transmission device 46.

The steering mechanism 43 includes a steering cylinder 44. The steering angle of the front wheels 41 is changed by expanding and contracting the steering cylinder 44. The change in the steering angle of the front wheels 41 is performed by expanding and contracting the steering cylinder 44 through the operation of the operation device 6. The steering cylinder 44 is, for example, a hydraulic cylinder. A steering angle sensor 45 is attached to the steering mechanism 43 and detects the steering angle of the front wheels 41 with respect to the front vehicle body 21. The steering angle sensor 45 may be, for example, a cylinder stroke sensor that detects the length of the steering cylinder 44.

The power transmission device 46 transmits the power generated by the power source 27 to the rear wheels 42 by changing the torque, rotation speed, and rotation direction. The power transmission device 46 switches between forward movement and rearward movement of the work vehicle 1. The work vehicle 1 switches between the forward movement and the rearward movement by the power transmission device 46. The power transmission device 46 is not limited to a configuration that includes a plurality of gears and a plurality of clutches. The power transmission device 46 may have a configuration including a hydraulic pump and a hydraulic motor, and including a hydraulic static transmission (HST) or a hydraulic mechanical transmission (HMT), which converts the power generated by the power source 27 into a hydraulic pressure and transmits the hydraulic pressure. Alternatively, the power transmission device 46 may have a configuration including an electric mechanical transmission (EMT) with a generator and an electric motor instead of the hydraulic pump and the hydraulic motor.

The cab 5 is supported by the front vehicle body 21. The cab 5 is disposed at the rear end part **21*r* of the front vehicle body 21. The cab 5 forms a space for the operator to board. The operation device 6, a display device 15, and various other operation devices are disposed inside the cab 5**.

Figure 4:
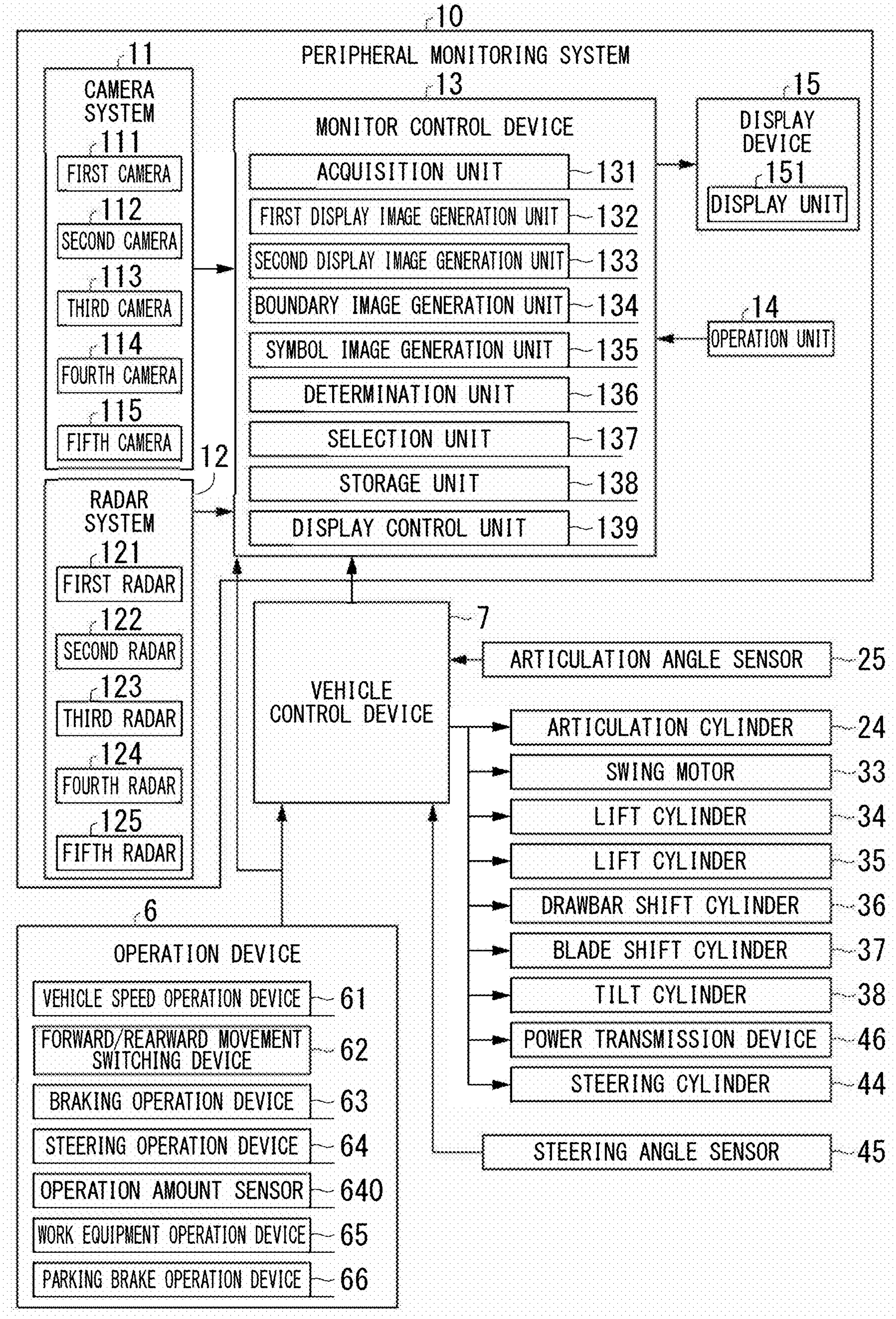
FIG. 4 is a functional block diagram showing the configuration of a work vehicle according to the first embodiment.

FIG. 4 is a functional block diagram showing the configuration of the work vehicle 1 according to the first embodiment. As shown in FIG. 4, the work vehicle 1 includes the operation device 6, a vehicle control device 7, and a peripheral monitoring system 10.

The operation device 6 generates an operation signal for operating the work vehicle 1. The operation device 6 is operated by the operator. The operation device 6 includes a vehicle speed operation device 61, a forward/rearward movement switching device 62, a braking operation device 63, a steering operation device 64, a work equipment operation device 65, and a parking brake operation device 66. When the operation device 6 is operated by the operator, the operation device 6 generates an operation signal. The operation signal generated by the operation device 6 is output to the vehicle control device 7 and the monitor control device 13. The operation signal output by the operation device 6 includes an operation signal for traveling the work vehicle 1. The operation device 6 outputs an operation signal based on the operator's operation to perform traveling, braking, and steering of the work vehicle 1. The term "traveling" refers to the forward movement or the rearward movement of the work vehicle 1. The braking refers to the deceleration or stopping of the work vehicle 1. The steering refers to a change in the traveling direction of the work vehicle 1.

The forward/rearward movement switching device 62 is, for example, a three-position alternate switch. The forward/rearward movement switching device 62 is operable in a forward position, a neutral position, and a rearward position. The operator operates the forward/rearward movement switching device 62 to output an operation signal for switching the traveling direction of the work vehicle 1 to forward, neutral, or rearward.

In the first embodiment, the steering operation device 64 is a steering wheel. The operator operates the steering operation device 64 to change the steering angle of the front wheels 41, thereby changing the traveling direction of the work vehicle 1. In addition, the steering operation device 64 is not limited to the steering wheel and may, for example, be a steering lever that is steered by lever operation. Alternatively, a configuration can be adopted in which both the steering wheel and the steering lever are provided.

An operation amount sensor 640 for detecting the operation amount of the steering operation device 64 by the operator is attached to the steering operation device 64. In the first embodiment, the operation amount sensor 640 is a steering wheel sensor attached to the steering wheel. The operation amount sensor 640 detects the operation amount of the steering operation device 64 by the operator and outputs operation amount data to the vehicle control device 7. In the first embodiment, the operation amount sensor 640 is, for example, a shaft displacement sensor that detects an angle displacement of a steering wheel shaft generated by the rotation of the steering wheel. In addition, in a case where the steering operation device 64 is the steering lever, the operation amount sensor 640 may be a position sensor that detects an angle position of the steering lever.

The parking brake operation device 66 is, for example, a toggle switch. The operator operates the parking brake operation device 66, whereby an operation signal for switching the parking brake to the engaged state or the released state is output.

The vehicle control device 7 outputs a control command for operating the work vehicle 1 based on the operation signal from the operation device 6.

The control command output from the vehicle control device 7 in order to perform the traveling of the work vehicle 1 includes a control command for increasing the output of the power source 27 and a control command for switching between the forward movement and the rearward movement of the work vehicle 1 by the power transmission device 46. The control command for increasing the output of the power source 27 is output based on the operation signal output from the vehicle speed operation device 61. The control command for switching between the forward movement and the rearward movement of the work vehicle 1 by the power transmission device 46 is output based on the operation signal output from the forward/rearward movement switching device 62.

The control command output from the vehicle control device 7 in order to perform the braking of the work vehicle 1 includes a control command for operating a service brake (not shown). The control command for operating the service brake is output based on the operation signal output from the braking operation device 63.

The control command output from the vehicle control device 7 in order to steer the work vehicle 1 includes a control command for operating the steering cylinder 44. The control command for operating the steering cylinder 44 is output based on the operation signal output from the steering operation device 64.

The control command output from the vehicle control device 7 in order to swing the front vehicle body 21 with respect to the rear vehicle body 22 includes a control command for operating the articulation cylinder 24. The control command for operating the articulation cylinder 24 is output based on the operation signal output from the work equipment operation device 65.

The control command output from the vehicle control device 7 in order to operate the parking brake (not shown) is output based on the operation signal output from the parking brake operation device 66.

The vehicle control device 7 acquires articulation angle data detected by the articulation angle sensor 25, steering angle data detected by the steering angle sensor 45, and operation amount data detected by the operation amount sensor 640. In the first embodiment, the vehicle control device 7 outputs the steering angle data to the monitor control device 13, which will be described below. In addition, the steering angle data output by the vehicle control device 7 is not limited to data acquired from the steering angle sensor 45. The steering angle data may be calculated based on, for example, the operation amount data detected by the operation amount sensor 640.

In the steering angle data according to the first embodiment, a value of the steering angle when the front wheels 41 are parallel to the front-rear direction of the front vehicle body 21 is set to zero, a value of the steering angle when the front wheels 41 are directed to the right side with respect to the front vehicle body 21 in the front-rear direction is set to a positive number, and a value of the steering angle when the front wheels 41 are directed to the left side with respect to the front vehicle body 21 in the front-rear direction is set to a negative number.

<<Peripheral Monitoring System 10>>

The peripheral monitoring system 10 monitors the periphery of the work vehicle 1. The peripheral monitoring system 10 includes a camera system 11, a radar system 12, a monitor control device 13, an operation unit 14, and a display device 15.

The camera system 11 includes a plurality of cameras. The camera includes an optical system and an image sensor. Examples of the image sensor include a couple charged device (CCD) image sensor and a complementary metal-oxide-semiconductor (CMOS) image sensor. The camera is provided on the vehicle body 2 of the work vehicle 1 to image in different directions. The camera images the periphery of the work vehicle 1 to acquire an image of the periphery of the work vehicle 1. The camera images at least the periphery of the vehicle body 2. In the following description, the image acquired by the camera of the camera system 11 is appropriately referred to as a camera image.

The radar system 12 includes a plurality of radars. The radar is provided on the vehicle body 2 of the work vehicle 1. The radar detects obstacles of the periphery of the work vehicle 1 in a non-contact manner.

Figure 5:
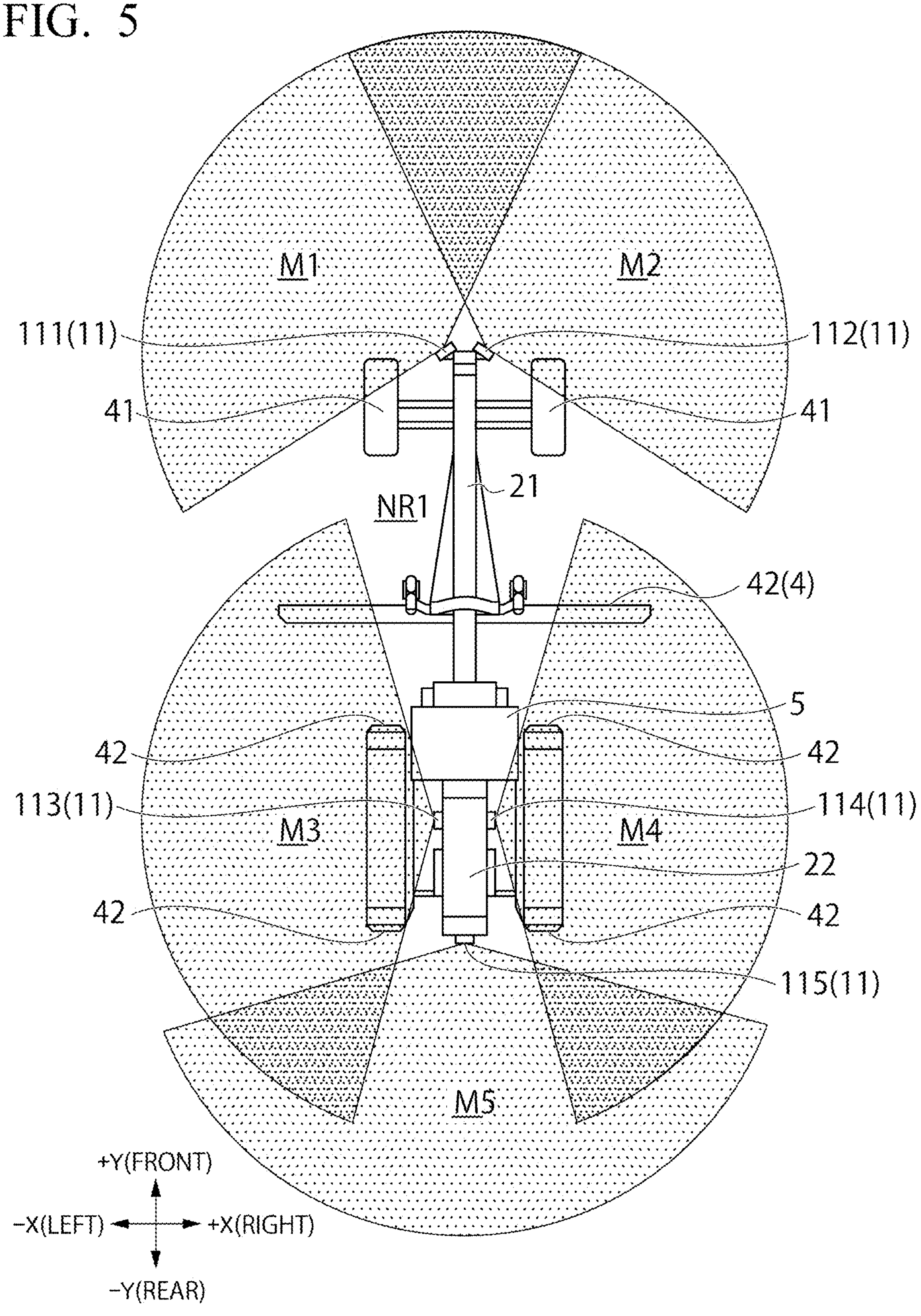
FIG. 5 is a top view schematically showing a camera system according to the first embodiment.

FIG. 5 is a top view schematically showing the camera system 11 according to the first embodiment. As shown in FIGS. 1, 2, and 5, the camera system 11 includes a first camera 111 provided on the front vehicle body 21, a second camera 112 provided on the front vehicle body 21, a third camera 113 provided on the rear vehicle body 22, a fourth camera 114 provided on the rear vehicle body 22, and a fifth camera 115 provided on the rear vehicle body 22. The first camera 111 and the second camera 112 image in front of the work vehicle 1. The third camera 113, the fourth camera 114, and the fifth camera 115 image of the rear side of the work vehicle 1.

The first camera 111 is provided at the left part of the front end part **21*f* of the front vehicle body 21. The first camera 111 images the left front side of the work vehicle 1. An imaging range M1 of the first camera 111 is defined in the left front side of the work vehicle 1**.

The second camera 112 is provided at the right part of the front end part **21*f* of the front vehicle body 21. The second camera 112 images the right front side of the work vehicle 1. An imaging range M2 of the second camera 112 is defined in the right front side of the work vehicle 1**.

The third camera 113 is provided at the left part of the rear vehicle body 22. The third camera 113 images the left side of the work vehicle 1. An imaging range M3 of the third camera 113 is defined in the left side of the work vehicle 1.

The fourth camera 114 is provided at the right part of the rear vehicle body 22. The fourth camera 114 images the right side of the work vehicle 1. An imaging range M4 of the fourth camera 114 is defined in the right side of the work vehicle 1.

The fifth camera 115 is provided at the rear end part 22*r* of the rear vehicle body 22. The fifth camera 115 images the rear side of the work vehicle 1. An imaging range M5 of the fifth camera 115 is defined in the rear side of the work vehicle 1.

In addition, the attachment position of the camera system 11 is not limited to the above-described position and is not particularly limited as long as the camera system 11 can acquire images of the periphery of the work vehicle 1. For example, the first camera 111 and the second camera 112 may be provided on the counterweight 28. For example, the third camera 113, the fourth camera 114, and the fifth camera 115 may be provided in the cab 5.

At least a part of the imaging range M1 and the imaging range M2 overlap. At least a part of the imaging range M3 and the imaging range M5 overlap. At least a part of the imaging range M4 and the imaging range M5 overlap.

A non-imaging range NR1, in which an image is not captured by the camera system 11, is provided at a part of the periphery of the cab 5. The non-imaging range NR1 is defined in both the left front side of the cab 5 and in the right front side of the cab 5.

Figure 6:
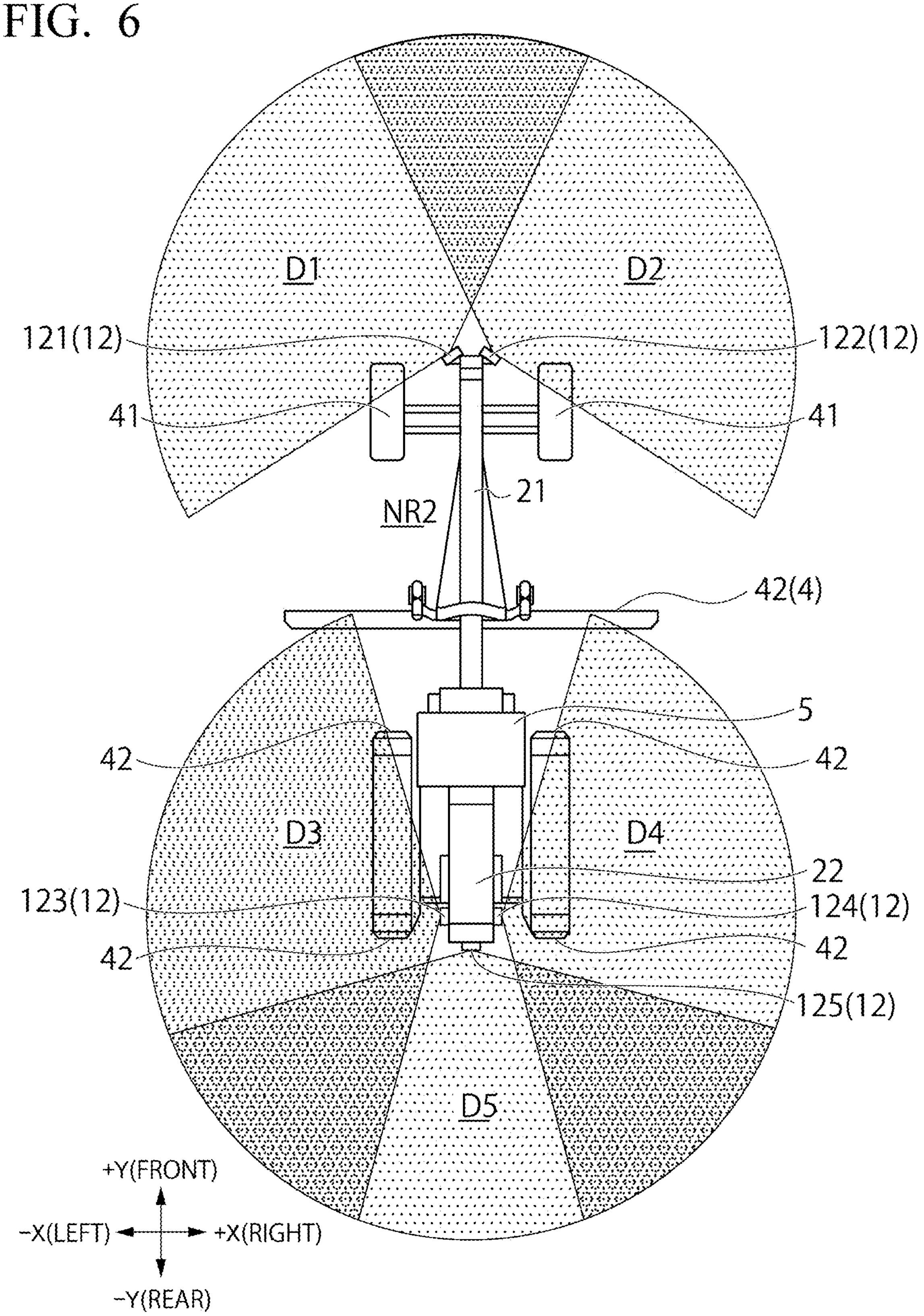
FIG. 6 is a top view schematically showing a radar system according to the first embodiment.

FIG. 6 is a top view schematically showing the radar system 12 according to the first embodiment. As shown in FIGS. 1, 2, and 6, the radar system 12 includes a first radar 121 provided on the front vehicle body 21, a second radar 122 provided on the front vehicle body 21, a third radar 123 provided on the rear vehicle body 22, a fourth radar 124 provided on the rear vehicle body 22, and a fifth radar 125 provided on the rear vehicle body 22.

The first radar 121 is provided at the left part of the front end part 21*f* of the front vehicle body 21. The first radar 121 detects the left front side of the work vehicle 1. A detection range D1 of the first radar 121 is defined in the left front side of the work vehicle 1.

The second radar 122 is provided at the right part of the front end part 21*f* of the front vehicle body 21. The second radar 122 detects the right front side of the work vehicle 1. A detection range D2 of the second radar 122 is defined in the right front side of the work vehicle 1.

The third radar 123 is provided at the left part of the rear vehicle body 22. The third radar 123 detects the left side of the work vehicle 1. A detection range D3 of the third radar 123 is defined in the left side of the work vehicle 1.

The fourth radar 124 is provided at the right part of the rear vehicle body 22. The fourth radar 124 detects the right side of the work vehicle 1. A detection range D4 of the fourth radar 124 is defined in the right side of the work vehicle 1.

The fifth radar 125 is provided at the rear end part 22*r* of the rear vehicle body 22. The fifth radar 125 detects the rear side of the work vehicle 1. A detection range D5 of the fifth radar 125 is defined in the rear side of the work vehicle 1.

In addition, the attachment position of the radar system 12 is not limited to the above-described position and is not particularly limited as long as it is a position where obstacles of the periphery of the work vehicle 1 can be detected. For example, the first radar 121 and the second radar 122 may be provided on the counterweight 28. For example, the third radar 123, the fourth radar 124, and the fifth radar 125 may be provided in the cab 5.

At least a part of the detection range D1 and the detection range D2 overlap. At least a part of the detection range D3 and the detection range D5 overlap. At least a part of the detection range D4 and the detection range D5 overlap.

A non-detection range NR2 that is not detected by the radar system 12 is provided in a part of the periphery of the cab 5. The non-detection range NR2 is defined in the left front side of the cab 5 and in the right front side of the cab 5.

The monitor control device 13 includes a computer system. The monitor control device 13 includes an acquisition unit 131, a first display image generation unit 132, a second display image generation unit 133, a boundary image generation unit 134, a symbol image generation unit 135, a determination unit 136, a selection unit 137, a storage unit 138, and a display control unit 139. The monitor control device 13 may include a single computer system or may function as the monitor control device 13 through the cooperation of multiple computer systems.

The acquisition unit 131 acquires a camera image from the camera system 11. The acquisition unit 131 acquires a first camera image showing the situation of the left front side of the front vehicle body 21 from the first camera 111. The acquisition unit 131 acquires the second camera image showing the situation of the right front side of the front vehicle body 21 from the second camera 112. The acquisition unit 131 acquires a third camera image showing the situation of the left side of the rear vehicle body 22 from the third camera 113. The acquisition unit 131 acquires the fourth camera image showing the situation of the right side of the rear vehicle body 22 from the fourth camera 114. The acquisition unit 131 acquires a fifth camera image showing the situation of the rear side of the rear vehicle body 22 from the fifth camera 115. The acquisition unit 131 acquires the radar detection data from the radar system 12.

The acquisition unit 131 acquires the steering angle data of the front wheels 41 from the vehicle control device 7. The acquisition unit 131 acquires an operation signal from the operation device 6. In the first embodiment, the acquisition unit 131 acquires the operation signal from the forward/rearward movement switching device 62 and the operation signal from the parking brake operation device 66.

The first display image generation unit 132 generates a first display image IM1 showing a first part of the periphery of the work vehicle 1 based on the first camera image of the periphery of the work vehicle 1 captured by the first camera 111 and the second camera image of the periphery of the work vehicle 1 captured by the second camera 112. In the first embodiment, the first display image IM1 includes the front part of the periphery of the work vehicle 1. The first display image IM1 includes the periphery of the front vehicle body 21.

The first display image IM1 is a first viewpoint image viewed from a first viewpoint different from the position of the first camera 111 and the position of the second camera 112. In the first embodiment, the first display image generation unit 132 generates a panoramic image showing the periphery of the front vehicle body 21 based on the first camera image and the second camera image.

The panoramic image refers to an image generated by combining a plurality of camera images acquired by each of the plurality of cameras with images in a plurality of visual line directions with a reference viewpoint for the generation of the panoramic image as the viewpoint position. For example, the panoramic image of the entire circumference is an image in which images corresponding to a plurality of visual line directions in the range of 0° to +180° and the range of 0° to −180°, with the reference viewpoint as the center, are continuously connected. In a case of a panoramic image of the entire circumference, an image in any visual line direction within a range of 360 degrees is obtained. In addition, the panoramic image need not correspond to the entire circumference. For example, an image corresponding to the visual line direction in a range of 0° to +90° and a range of 0° to −90° (a 180° panoramic image) may be used. In addition, the panoramic image may be an image in which images corresponding to a plurality of visual line directions obtained by rotating the visual line directions in the horizontal direction are continuously connected, or may be an image in which images corresponding to a plurality of visual line directions obtained by rotating the visual line directions in the vertical direction are continuously connected. In addition, the panoramic image may be an image in which images corresponding to a plurality of visual line directions obtained by changing the visual line direction in three dimensions are continuously connected, as in the all-sky image. In the first embodiment, the panoramic image is generated such that the right end part of the first camera image and the left end part of the second camera image are connected to each other. In the following description, the first display image IM1 will be appropriately referred to as the panoramic image IM1.

The second display image generation unit 133 generates a second display image IM2 showing a second part of the periphery of the work vehicle 1 based on the third camera image of the periphery of the work vehicle 1 captured by the third camera 113, the fourth camera image of the periphery of the work vehicle 1 captured by the fourth camera 114, and the fifth camera image of the periphery of the work vehicle 1 captured by the fifth camera 115. In the first embodiment, the second display image IM2 includes the rear part of the periphery of the work vehicle 1. The second display image IM2 includes the periphery of the rear vehicle body 22.

The second display image IM2 is a second viewpoint image viewed from a second viewpoint different from the positions of the third camera 113, the fourth camera 114, and the fifth camera 115. In the first embodiment, the second display image generation unit 133 generates the bird's-eye view image showing the periphery of the rear vehicle body 22 based on the third camera image, the fourth camera image, and the fifth camera image. The bird's-eye view image refers to an image generated by converting a plurality of camera images acquired by each of the plurality of cameras into an upper viewpoint related to generation of the bird's-eye view image and combining the images.

The second display image IM2 is an image with a display form different from that of the first display image IM1. For example, the second display image IM2 is an image viewed from a viewpoint different from that of the first display image IM1.

In the following description, the second display image IM2 will be appropriately referred to as a bird's-eye view image IM2.

The boundary image generation unit 134 generates a boundary image BI disposed between the panoramic image IM1 and the bird's-eye view image IM2. The boundary image BI refers to an image displayed at the boundary between the panoramic image IM1 and the bird's-eye view image IM2 to clearly distinguish between the panoramic image IM1 and the bird's-eye view image IM2.

The symbol image generation unit 135 generates a symbol image SI indicating the work vehicle 1. In the first embodiment, the symbol image generation unit 135 changes the symbol image SI based on the operation signal from the operation device 6. The symbol image SI refers to an image that simulates the work vehicle 1 as viewed from above.

The determination unit 136 determines the traveling state of the work vehicle 1 based on the operation signal from the operation device 6 acquired by the acquisition unit 131. In the first embodiment, the determination unit 136 determines whether the work vehicle 1 has transitioned to the forward moving state or the neutral state based on the operation signal from the forward/rearward movement switching device 62 acquired by the acquisition unit 131 and the operation signal from the parking brake operation device 66 acquired by the acquisition unit 131. Specifically, the determination unit 136 determines that the work vehicle 1 has transitioned to the forward moving state or the neutral state when the operation signal from the forward/rearward movement switching device 62 acquired by the acquisition unit 131 indicates the forward moving operation or the neutral operation of the power transmission device 46, and the operation signal from the parking brake operation device 66 acquired by the acquisition unit 131 indicates the release operation of the parking brake.

In a case where the determination unit 136 determines that the work vehicle 1 has transitioned to the forward moving state or the neutral state, the selection unit 137 selects any one of the camera images captured by the camera of the camera system 11 based on the steering angle data of the front wheels 41 acquired by the acquisition unit 131. In the first embodiment, when the determination unit 136 determines that the work vehicle 1 has transitioned to the forward moving state or the neutral state, the selection unit 137 selects either the camera image of the first camera 111 or the camera image of the second camera 112 based on the steering angle data of the front wheels 41 acquired by the acquisition unit 131. The selection unit 137 selects either the camera image of the first camera 111 or the camera image of the second camera 112 by comparing the steering angle data of the front wheels 41 acquired by the acquisition unit 131 with the threshold value.

Figure 7:
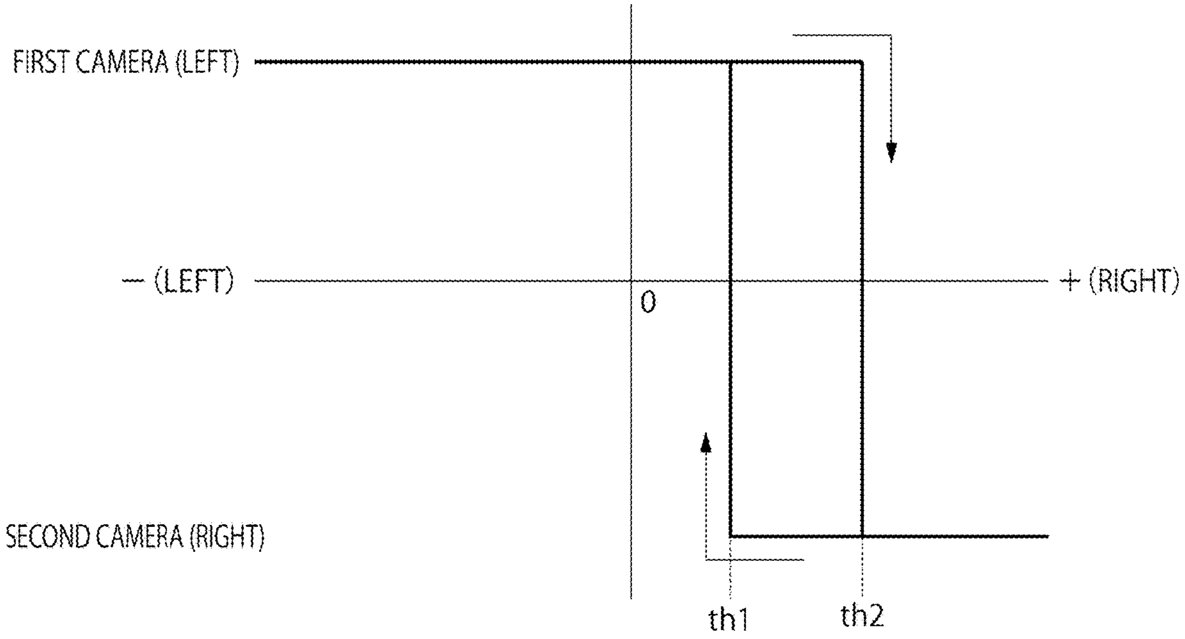
FIG. 7 is a diagram showing the relationship between a steering angle and a selected camera image according to the first embodiment.

FIG. 7 is a diagram showing the relationship between the steering angle and the selected camera image according to the first embodiment. As shown in FIG. 7, when the steering angle is less than a first threshold value th1, the selection unit 137 selects the camera image of the first camera 111. In a case where the steering angle is more than the second threshold value th2, the selection unit 137 selects the camera image of the second camera 112. The first threshold value is smaller than the second threshold value. That is, the selection unit 137 according to the first embodiment provides hysteresis with respect to the threshold value of the steering angle.

The first threshold value th1 and the second threshold value th2 are set to angles different from the steering angle during straight moving. As a result, the selection unit 137 selects either the camera image of the first camera 111 or the camera image of the second camera 112 so that the operator can appropriately recognize the situation in the front side even when the work vehicle 1 is traveling straight. Both the first threshold value th1 and the second threshold value th2 according to the first embodiment are positive numbers. That is, the selection unit 137 selects the first camera 111 that images the left side not only when the front wheels are facing the left side but also when the front wheels are facing the front side and when the front wheels are facing slightly to the right side. For example, when the work vehicle 1 performs leveling work while traveling on the left side of the road, the work vehicle 1 needs to travel close to the shoulder of the road on the left side of the road to dump the earth generated by the leveling work onto the shoulder of the road. Therefore, the selection unit 137 always selects the first camera 111 except when making a right turn, so that the operator can appropriately recognize the situation in the left front side. In addition, in a case where the operator wants to appropriately recognize the situation in the right front side, the first threshold value th1 and the second threshold value th2 may both be negative numbers. In addition, in another embodiment, the median value of the first threshold value th1 and the second threshold value th2 may be zero. In addition, the first threshold value th1 and the second threshold value th2 may be changed to desired values by the operation of the operator.

The storage unit 138 stores selection data indicating which camera image was last selected by the selection unit 137.

The display control unit 139 generates a composite image CI by combining the panoramic image IM1 generated by the first display image generation unit 132, the bird's-eye view image IM2 generated by the second display image generation unit 133, the boundary image BI generated by the boundary image generation unit 134, and the symbol image SI generated by the symbol image generation unit 135. The display control unit 139 displays the generated composite image CI on the display unit 151 of the display device 15. The display control unit 139 causes the display unit 151 of the display device 15 to display the single camera image IS showing the front of the work vehicle 1. The single camera image IS is a camera image captured by the camera selected by the selection unit 137.

The operation unit 14 includes a plurality of switches disposed in the cab 5. A specific function is assigned to each of the plurality of switches. In a case where the switch is operated by the operator, an operation signal for a specific function is generated.

<<Display Device>>

Figure 8:
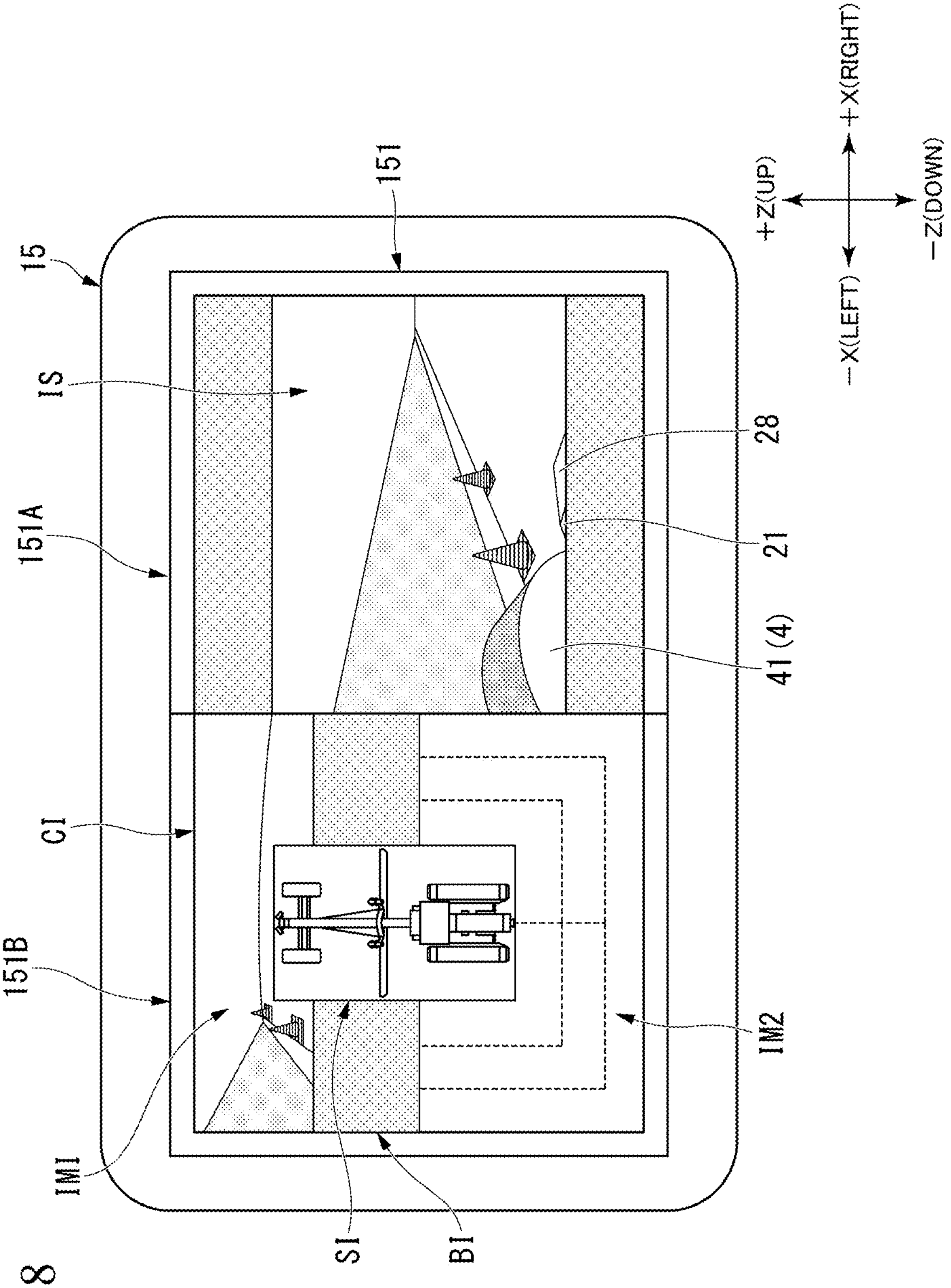
FIG. 8 is a diagram showing a display device according to the first embodiment.

FIG. 8 is a diagram showing the display device 15 according to the first embodiment. The display device 15 displays the periphery of the work vehicle 1. The display device 15 displays at least the periphery of the vehicle body 2. As shown in FIG. 8, the display device 15 includes the display unit 151. The display unit 151 may be, for example, a touch panel. In this case, the display unit 151 can function as the operation unit 14. In addition, the operator may change the first threshold value th1 and the second threshold value th2 to desired values by performing a touch operation on the touch panel.

The display unit 151 includes a first region 151A and a second region 151B. The first region 151A of the display unit 151 displays the single camera image IS. The second region 151B of the display unit 151 displays the composite image CI. In the first embodiment, the second region 151B is defined in the left side of the first region 151A.

In the example shown in FIG. 8, the single camera image IS displayed in the first region 151A is the first camera image showing the situation of the left front side of the work vehicle 1 acquired by the first camera 111.

In the example shown in FIG. 8, the composite image CI displayed in the second region 151B includes the panoramic image IM1, the bird's-eye view image IM2, the boundary image BI, and the symbol image SI. The panoramic image IM1 is displayed on a part of the composite image CI. The bird's-eye view image IM2 is displayed on a part of the composite image CI. A boundary image BI is displayed at the boundary between the panoramic image IM1 and the second display image IM2. The symbol image SI is displayed on the central region of the composite image CI. The composite image CI is displayed such that the panoramic image IM1, the bird's-eye view image IM2, and the boundary image BI are arranged around the symbol image SI. The panoramic image IM1 is disposed on the upper part of the composite image CI. The bird's-eye view image IM2 is disposed on the lower part of the composite image CI. The boundary image BI is displayed on the side part of the symbol image SI. The composite image CI clarifies the positional relationship between the work vehicle 1 and the periphery of the work vehicle 1 through the symbol image SI.

In the first embodiment, the boundary image BI is displayed on the side part of the articulation mechanism 23S of the symbol image SI. The boundary image BI is arranged to extend in the left-right direction in the composite image CI. The boundary image BI is displayed in a band shape on both the left side and the right side of the symbol image SI. The boundary image BI may be displayed on the display unit 151 between the front wheels and the cab of the symbol image SI. The boundary image BI may be displayed on a predetermined region below the panoramic image IM1 displayed as the composite image CI on the display unit 151. The boundary image BI may be displayed on a predetermined region above the bird's-eye view image IM2 displayed in the composite image CI on the display unit 151. The boundary image BI may be displayed on a predetermined region of the composite image CI on the display unit 151. The predetermined region may be defined by an image coordinate system with the pixel at the upper left of the composite image CI as the origin.

As described above, a non-imaging range NR1, which is not imaged by the camera system 11, is provided in a part of the periphery of the cab 5. The panoramic image IM1 and the bird's-eye view image IM2 are not generated for the non-imaging range NR1. That is, in the display unit 151, the region corresponding to the non-imaging range NR1 is a non-display region where the panoramic image IM1 and the bird's-eye view image IM2 are not displayed. The boundary image BI is generated to cover a non-display region where the panoramic image IM1 and the bird's-eye view image IM2 are not displayed on the display unit 151.

A reference line GD2 is displayed in the second region 151B in conjunction with the composite image CI. Similarly to a reference line GD1, the reference line GD2 indicates a reference for the distance from the vehicle body 2. In the first embodiment, the reference line GD2 is displayed to be superimposed on the bird's-eye view image IM2. The reference line GD2 is disposed around the symbol image SI in the bird's-eye view image IM2. The reference line GD2 does not need to be disposed.

In a case where an obstacle OB is detected by the radar system 12, the display control unit 139 may display a marker Mk on the display unit 151 to overlap the marker Mk with the obstacle OB imaged on the bird's-eye view image IM2. The marker MK functions as a symbol image for emphasizing the obstacle OB on the display unit 151.

<<Image Display Method>>

Figure 9:
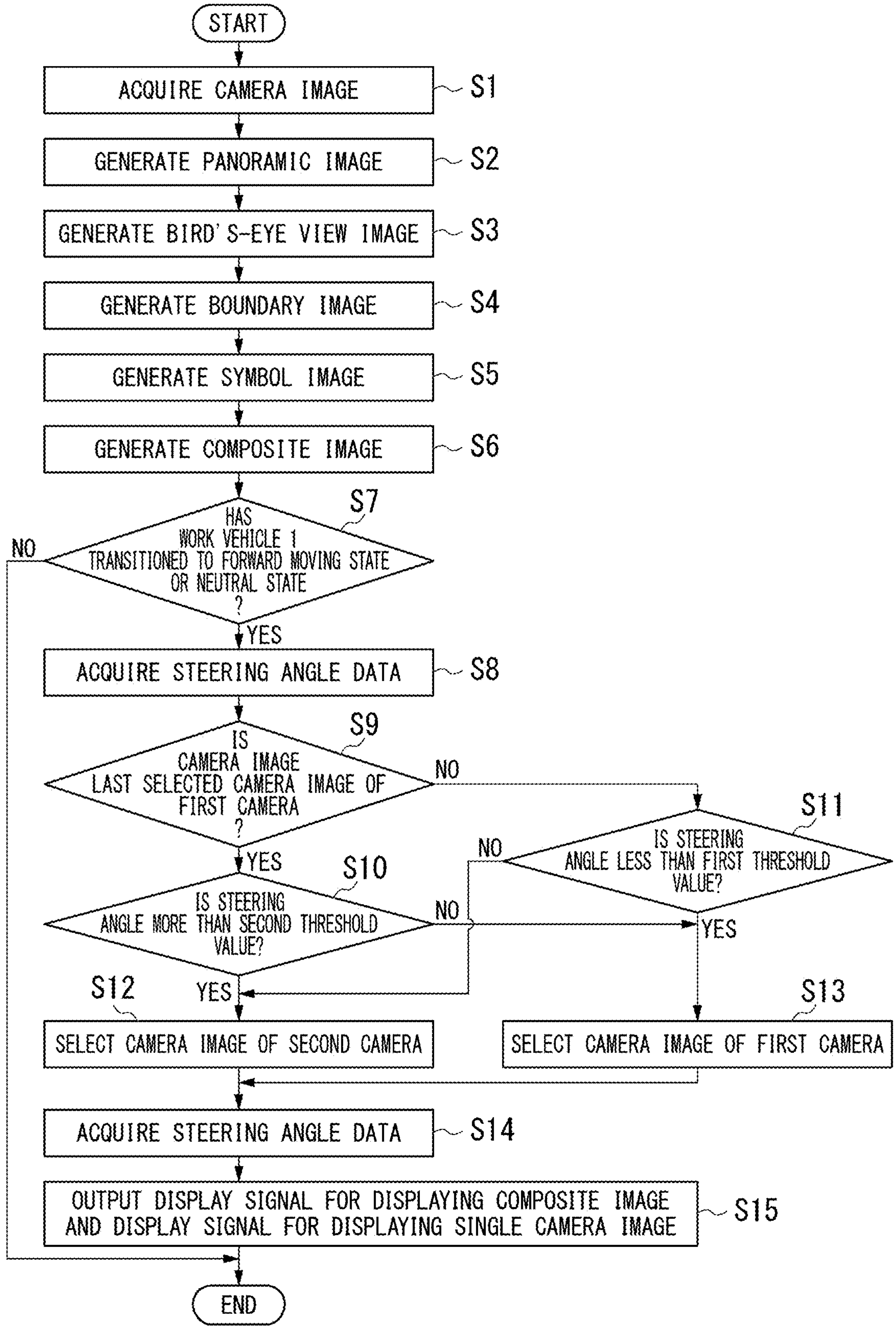
FIG. 9 is a flowchart showing an image display method according to the first embodiment.

FIG. 9 is a flowchart showing an image display method according to the first embodiment. When the key of the work vehicle 1 is turned on, the peripheral monitoring system 10 is activated.

The camera system 11 images the periphery of a motor grader 1. The acquisition unit 131 acquires the camera image from the camera system 11 (step S1).

The first display image generation unit 132 generates a panoramic image IM1 showing the front part of the periphery of the work vehicle 1 based on the first camera image of the periphery of the work vehicle 1 captured by the first camera 111 and the second camera image of the periphery of the work vehicle 1 captured by the second camera 112 (step S2).

The second display image generation unit 133 generates the bird's-eye view image IM2 showing the rear part of the periphery of the work vehicle 1 based on the third camera image in the periphery of the work vehicle 1 captured by the third camera 113, the fourth camera image of the periphery of the work vehicle 1 captured by the fourth camera 114, and the fifth camera image of the periphery of the work vehicle 1 captured by the fifth camera 115 (step S3).

The boundary image generation unit 134 generates the boundary image BI (step S4).

The symbol image generation unit 135 generates the symbol image SI based on the operation signal of the operation device 6 (step S5).

The display control unit 139 combines the symbol image SI, the panoramic image IM1, the bird's-eye view image IM2, and the boundary image BI to generate a composite image CI (step S6).

The determination unit 136 determines whether the work vehicle 1 has transitioned to the forward moving state or the neutral state based on the operation signal from the forward/rearward movement switching device 62 acquired by the acquisition unit 131 and the operation signal from the parking brake operation device 66 acquired by the acquisition unit 131 (step S7).

In a case where the determination unit 136 determines that the work vehicle 1 has transitioned to the forward moving state or the neutral state (step S7: YES), the acquisition unit 131 acquires the steering angle data from the vehicle control device 7 (step S8). Then, the selection unit 137 refers to the selection data stored in the storage unit 138 to determine whether the camera image last selected is the camera image of the first camera 111 (step S9).

On the other hand, in a case where the determination unit 136 determines that the work vehicle 1 has not transitioned to the forward moving state or the neutral state (step S7: NO), the process in FIG. 9 is ended.

In a case where it is determined that the camera image selected last time is the camera image of the first camera 111 (step S9: YES), the selection unit 137 determines whether the steering angle is more than the second threshold value th2 based on the steering angle data acquired in step S8 (step S10).

In a case where the determination is made that the steering angle is more than the second threshold value th2 (step S10: YES), the selection unit 137 selects the camera image of the second camera 112 (step S12).

In a case where the determination is made that the steering angle is not more than the second threshold value th2 (step S10: NO), the selection unit 137 selects the camera image of the first camera 111 (step S13).

In a case where the determination is made that the camera image selected last time is the camera image of the second camera 112 (step S9: NO), the selection unit 137 determines whether the steering angle is less than the first threshold value th1 based on the steering angle data acquired in step S8 (step S11).

In a case where the determination is made that the steering angle is less than the first threshold value th1 (step S11: YES), the selection unit 137 selects the camera image of the first camera 111 (step S13).

In a case where the determination is made that the steering angle is not less than the first threshold value th1 (step S11: NO), the selection unit 137 selects the camera image of the second camera 112 (step S12).

The storage unit 138 updates the selection data indicating which camera image is selected by the selection unit 137 (step S14).

The display control unit 139 outputs a display signal for displaying the composite image CI generated in step S6 and a display signal for displaying the camera image captured by the camera selected in step S12 or step S13 as the single camera image IS to the display device 15 (step S15).

<<Computer System>>

Figure 10:
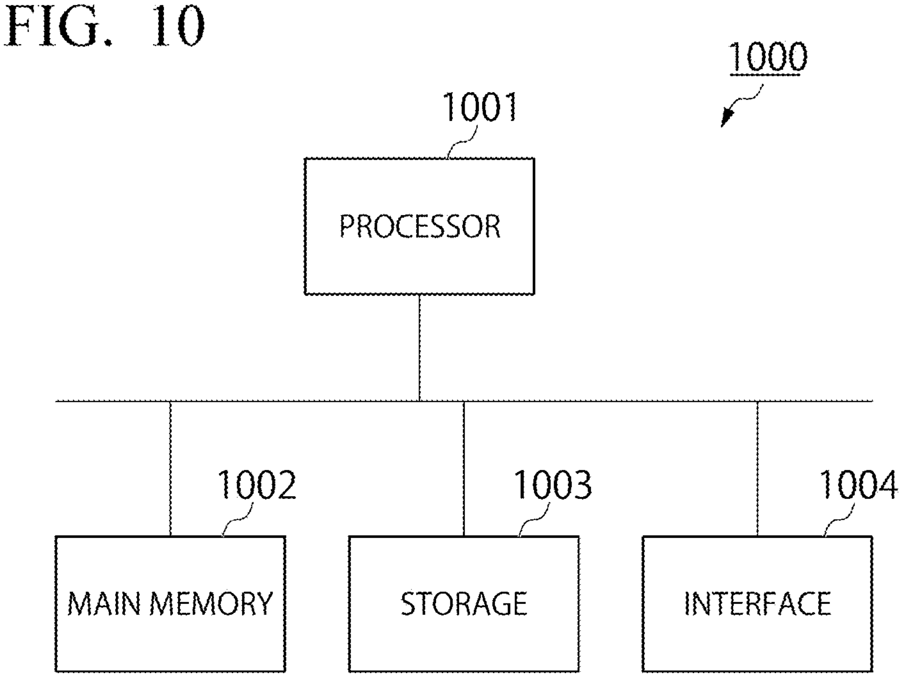
FIG. 10 is a block diagram showing a computer system according to the first embodiment.

FIG. 10 is a block diagram showing a computer system 1000 according to the first embodiment. Each of the monitor control device 13 and the vehicle control device 7 includes the computer system 1000. The computer system 1000 includes a processor 1001 such as a central processing unit (CPU), a main memory 1002 including a non-volatile memory such as a read only memory (ROM) and a volatile memory such as a random access memory (RAM), a storage 1003, and an interface 1004 including an input/output circuit. For example, the function of the monitor control device 13 is stored in the storage 1003 as a computer program. The processor 1001 reads the computer program from the storage 1003 and loads it into the main memory 1002 to execute the above-described processing according to the computer program. The computer program may be distributed to the computer system 1000 via a network.

Operations and Effects

As described above, according to the first embodiment, the monitor control device 13 selects and displays the camera image related to the single camera image IS based on the steering angle of the front wheels 41. As a result, the work vehicle 1 can appropriately recognize the situation in front of the work vehicle 1 in the traveling direction according to the steering operation by the operator. In the work vehicle 1 including the front wheels 41 that are provided so as to be steerable at the front end part of the vehicle body 2 and the cab 5 that is supported by the vehicle body 2 to be disposed on the rear side of the front wheels 41, the state of the vicinity of the front wheels 41, which is difficult for an operator to recognize, can be notified to the operator. In particular, when the operator allows the work vehicle 1 to travel, the operator can appropriately recognize the situation in front of the work vehicle 1 in the traveling direction according to the steering operation.

In addition, in the first embodiment, the first threshold value th1 and the second threshold value th2 of the steering angle, at which the camera image captured by the first camera 111 and the camera image captured by the second camera 112 are switched, are set to angles different from the steering angle during straight moving. As a result, even when the work vehicle 1 travels straight, the operator can appropriately recognize the situation in the front side.

Second Embodiment

The peripheral monitoring system 10 according to the first embodiment selects the camera image related to the single camera image IS based on the steering angle. On the other hand, the peripheral monitoring system 10 according to the second embodiment further selects the camera with reference to the articulation angle of the front vehicle body 21.

Specifically, the vehicle control device 7 calculates the sum of the articulation angle and the steering angle from the steering angle data detected by the steering angle sensor 45 and the articulation angle data detected by the articulation angle sensor 25. Then, the selection unit 137 selects the camera image related to the single camera image IS based on the sum of the steering angle and the articulation angle calculated by the vehicle control device 7. Specifically, the selection unit 137 selects either the camera image captured by the first camera 111 or the camera image captured by the second camera 112 by comparing the sum of the articulation angle and the steering angle with the first threshold value th1 or the second threshold value th2. For example, in a case where the articulation direction and the steering direction are opposite to each other, the articulation angle and the steering angle cancel each other out. Therefore, by selecting the camera image related to the single camera image IS using the sum of the articulation angle and the steering angle, the operator can more appropriately recognize the situation in the direction according to the turning.

In another embodiment, in a case where the front wheels 41 has the leaning function, the selection unit 137 may select the camera image related to the single camera image IS based on the leaning angle in addition to the articulation angle and the steering angle. The leaning function is a function of changing the turning angle of the work vehicle 1 by tilting the rotation axis of the front wheels 41 in the up-down direction.

Another Embodiment

The peripheral monitoring system 10 according to another embodiment may not include the display device 15 and the radar system 12. For example, the peripheral monitoring system 10 according to another embodiment need only output a signal for displaying on the monitor. In addition, the peripheral monitoring system 10 according to another embodiment may detect obstacles by performing image analysis on the camera images from the camera system 11 instead of the radar system 12. In addition, the peripheral monitoring system 10 according to another embodiment may not have a function of detecting obstacles. In addition, some components of the peripheral monitoring system 10 may be mounted inside the work vehicle 1, while other components may be provided outside the work vehicle 1. For example, the display device 15 of the peripheral monitoring system 10 may be disposed in a remote operation room located at a remote location from the work vehicle 1.

The display control unit 139 according to the first embodiment causes the display device 15 to display the composite image CI and the single camera image IS, but is not limited thereto. For example, the display control unit 139 according to another embodiment may display only the single camera image IS on the display device 15.

The camera system 11 according to the first embodiment includes the first camera 111 and the second camera 112 provided on the front vehicle body 21, but is not limited thereto. For example, the camera system 11 according to another embodiment may have any number of cameras, three or more, in the front vehicle body 21.

The camera system 11 according to the first embodiment includes the third camera 113, the fourth camera 114, and the fifth camera 115 provided on the rear vehicle body 22, but is not limited thereto. For example, the camera system 11 according to another embodiment may include two cameras or any number of cameras, which are four or more, provided on the rear vehicle body 22.

In another embodiment, the imaging range M1 and the imaging range M2 may not overlap. The imaging range M3 and the imaging range M5 may not overlap. The imaging range M4 and the imaging range M5 may not overlap.

In another embodiment, the cab 5 may be supported by the rear vehicle body 22.

In another embodiment, the work vehicle 1 may be an articulated dump truck having an articulation mechanism. In addition, the work vehicle 1 may be a wheel loader including an articulation mechanism and work equipment.

INDUSTRIAL APPLICABILITY

According to the above aspect, the work vehicle can make the operator appropriately recognize the situation in front of the work vehicle in the traveling direction according to the steering operation.

The invention claimed is:

1. A system for displaying a peripheral image of a work vehicle, the work vehicle including a vehicle body, a parking brake, and front wheels that are attached so as to be steerable to a front end part of the vehicle body, the system comprising:

a steering angle sensor configured to detect a steering angle of the front wheels;

a plurality of cameras that are provided on the vehicle body and configured to capture images in different directions;

a display device; and a processor, wherein the processor is configured to, in response to receiving a command signal for releasing the parking brake, (i) select any one of the images captured by the plurality of cameras based on the steering angle of the front wheels, and (ii) output a signal for displaying the selected image on the display device.

2. The system according to claim 1, wherein the plurality of cameras include (i) a first camera that is provided at the front end part of the vehicle body and configured to capture an image of a left front side of the work vehicle, and (ii) a second camera that is provided at the front end part of the vehicle body and configured to capture an image of a right front side of the work vehicle, and wherein the processor is configured to select either one of the image captured by the first camera or the image captured by the second camera based on the steering angle of the front wheels.

3. The system according to claim 2, wherein the processor is configured to select either one of the image captured by the first camera or the image captured by the second camera, by comparing the steering angle of the front wheels with a threshold value, and wherein the threshold value is different from a steering angle of the work vehicle during straight moving.

4. The system according to claim 1, wherein the work vehicle includes a power transmission device configured to switch between a forward movement and a rearward movement, and wherein the processor is configured to, based on receiving a command signal to switch the power transmission device to the forward movement, select any one of the images captured by the plurality of cameras based on the steering angle of the front wheels.

5. The system according to claim 1, wherein the vehicle body of the work vehicle includes a rear vehicle body and a front vehicle body that is swingably coupled to the rear vehicle body, wherein the system further comprises an articulation angle sensor configured to detect an articulation angle of the front vehicle body with respect to the rear vehicle body, and wherein the processor is configured to select any one of the images captured by the plurality of cameras based on a sum of the steering angle and the articulation angle.

6. A method for displaying a peripheral image of a work vehicle including a vehicle body, front wheels that are attached so as to be steerable to a front end part of the vehicle body, a steering angle sensor configured to detect a steering angle of the front wheels, a plurality of cameras that are provided on the vehicle body and configured to capture images in different directions, and a display device, the method comprising:

acquiring the steering angle of the front wheels detected by the steering angle sensor;

selecting any one of the images captured by the plurality of cameras based on the steering angle of the front wheels; and outputting a signal for displaying the selected image on the display device.

7. A work vehicle comprising:

a vehicle body;

front wheels that are attached so as to be steerable to a front end part of the vehicle body;

a cab that is supported by the vehicle body to be disposed on a rear side of the front wheels;

a steering angle sensor configured to detect a steering angle of the front wheels;

a plurality of cameras that are provided on the vehicle body and configured to capture images in different directions;

a display device that is provided in the cab;

a parking brake; and a processor, wherein the processor is configured to, in response to receiving a command signal for releasing the parking brake, (i) select any one of the images captured by the plurality of cameras based on the steering angle of the front wheels, and (ii) output a signal for displaying the selected image on the display device.

8. A system for displaying a peripheral image of a work vehicle including a vehicle body, a parking brake, and front wheels that are attached so as to be steerable to a front end part of the vehicle body, the system comprising:

a steering angle sensor configured to detect a steering angle of the front wheels;

a plurality of cameras that are provided on the vehicle body and configured to capture images in different directions;

a display device; and a processor, wherein the processor is configured to:

determine whether the work vehicle has transitioned to a forward moving state or a neutral state based on an operation signal from a forward/rearward movement switching device, select any one of the images captured by the plurality of cameras based on the steering angle of the front wheels in response to determining that the work vehicle has transitioned to the forward moving state or the neutral state, and output a signal for displaying the selected image on the display device.

9. The system according to claim 8, wherein the processor is configured to, in response to receiving a command signal for releasing the parking brake, select any one of the images captured by the plurality of cameras based on the steering angle of the front wheels.

10. The system according to claim 8, wherein the work vehicle includes a power transmission device configured to switch between a forward movement and a rearward movement, and wherein the processor is configured to, based on receiving a command signal to switch the power transmission device to the forward movement, select any one of the images captured by the plurality of cameras based on the steering angle of the front wheels.

* * * * *